United States Patent
Woods et al.

(10) Patent No.: US 9,242,313 B2
(45) Date of Patent: Jan. 26, 2016

(54) WELDING FURNACE AND VIEWPORT ASSEMBLY

(75) Inventors: Steven Charles Woods, Easley, SC (US); Ronald Lee Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 747 days.

(21) Appl. No.: 13/561,778

(22) Filed: Jul. 30, 2012

(65) Prior Publication Data

US 2014/0030667 A1  Jan. 30, 2014

(51) Int. Cl.
*B01J 3/04* (2006.01)
*B23K 13/01* (2006.01)
*B23K 9/32* (2006.01)
*B23K 28/00* (2006.01)

(52) U.S. Cl.
CPC ......... *B23K 28/003* (2013.01); *B23K 2201/001* (2013.01); *B23K 2203/08* (2013.01)

(58) Field of Classification Search
None
See application file for complete search history.

(56) References Cited

U.S. PATENT DOCUMENTS

| | | | |
|---|---|---|---|
| 4,111,753 A * | 9/1978 | Folsom et al. | 435/3 |
| 4,200,805 A * | 4/1980 | Le Francois | 422/186.06 |
| 4,653,732 A | 3/1987 | Wunning et al. | |
| 5,505,599 A * | 4/1996 | Kemerer et al. | 425/4 C |
| 5,505,654 A * | 4/1996 | Wood et al. | 451/6 |
| 5,876,118 A * | 3/1999 | Vogel | 374/11 |
| 6,124,568 A | 9/2000 | Broderick et al. | |
| 6,297,474 B1 | 10/2001 | Kelly et al. | |
| 6,428,122 B1 * | 8/2002 | Henry et al. | 312/1 |
| 6,583,387 B2 | 6/2003 | Kelly et al. | |
| 7,150,627 B2 * | 12/2006 | Gaur et al. | 432/144 |
| 7,255,829 B1 | 8/2007 | Peter et al. | |
| 8,580,052 B2 * | 11/2013 | Meyer | 148/548 |
| 2003/0117596 A1 * | 6/2003 | Nishi | 355/51 |
| 2010/0107567 A1 * | 5/2010 | Khan et al. | 53/469 |
| 2010/0226629 A1 * | 9/2010 | Basol et al. | 392/407 |
| 2010/0300867 A1 * | 12/2010 | Kim et al. | 201/37 |
| 2013/0095006 A1 * | 4/2013 | Hsu | 422/500 |
| 2014/0053515 A1 * | 2/2014 | Koolhaas et al. | 53/557 |
| 2015/0090768 A1 * | 4/2015 | Kuroda et al. | 228/46 |

\* cited by examiner

*Primary Examiner* — Gregory Huson
*Assistant Examiner* — Eric Gorman
(74) *Attorney, Agent, or Firm* — Ernest G. Cusick; Hoffman Warnick LLC

(57) ABSTRACT

A viewport assembly may allow viewing of a retort chamber while protecting the viewer from heat of the retort chamber through a high-temperature-resistant window in an end wall of the viewport assembly. An access port in the end wall may allow use of tools, such as a welding device. An insulated door between the viewport assembly and the retort chamber may enhance protection and heat retention. The assembly may enhance retention of inert atmosphere in the retort chamber as well as heat, facilitating work on superalloy articles.

8 Claims, 3 Drawing Sheets

WELDING FURNACE AND VIEWPORT ASSEMBLY

BACKGROUND OF THE INVENTION

The disclosure relates generally to welding furnaces, and more particularly to welding furnaces allowing special handling of work pieces made from superalloys.

Components of apparatus that are exposed to high temperatures and/or high stress environments, such as rotor blades in a gas turbine engine, for example, are generally made of high performance alloys. In particular, so-called "superalloys" have come into wide use for such applications. These superalloys typically are based on nickel and/or cobalt and are generally used to form articles by casting. However, circumstances arise in which components must be welded. For example, because superalloys are expensive, it has become desirable to repair or restore parts made from superalloys rather than outright replace such parts. While articles of relatively simple geometries may be welded in currently-available welding apparatus with success, articles of more complex geometries may not enjoy as successful or high quality welding in such apparatus, particularly where such articles are processed at elevated temperatures. In addition, superalloy parts tend to oxidize in ambient atmosphere at such elevated temperatures, which contributes to failure or poor quality of welds.

Some superalloy components require thermal stress relief prior to welding so that residual stresses in the components may be removed or relieved. For example, if a component has been removed from service in a gas turbine, such as for reconditioning or repair, stresses may remain in the component as a result of its service. Welding and/or cooling after welding may also induce stresses in components requiring additional stress relief, such as with heat treatment. As is known, heat treatment follows specific processes including ramping rates, soak temperatures, hold times, and cooling rates that improve the likelihood of achieving desired qualities in the final article or component. Deviation from these processes may result in flaws or undesired characteristics of the final article or component. As a result, it is recognized that a high degree of control over the environment in which an article is processed is desirable.

Heat treatment of articles in the past generally employed large-scale blast furnaces and the like in which large numbers of articles were treated at the same time. However, such large-scale solutions typically have long heat treatment times due to several factors. For example, a large blast furnace as a large mass to heat, and the typically large number of parts being heat treated in a batch adds additional mass. Additionally, long queuing times may occur while batches are assembled as individual components are repaired. Therefore, batch furnace pre-weld and post-weld stress relief heat treatments may cause delay in a welding line. Further, such large-scale blast furnaces typically have no control over the atmospheric composition to which the parts are exposed, thus exposing superalloy parts to potentially oxidizing ambient atmosphere.

BRIEF DESCRIPTION OF THE INVENTION

Embodiments of the invention disclosed herein may take the form of a welding apparatus having a first enclosure arranged to receive an article to be processed and a heating system arranged to heat the article to be processed in the first enclosure. A first enclosure door into the first enclosure may be arranged to selectively allow access to the first enclosure through a first side of the first enclosure, and an atmosphere control system may be arranged to provide a substantially inert atmosphere in at least the first enclosure. The atmosphere control system may include a sealing system arranged to retain a desired atmosphere in each enclosure under control of the atmosphere control system. A viewport assembly may be arranged on a second side of the first enclosure and may include a window made of a high-temperature-resistant, substantially transparent material arranged to allow viewing of the first enclosure from outside the first enclosure.

Another embodiment may include a viewport assembly for a welding apparatus having a neck extending from an attachment end to a viewing end. The attachment end may include an attachment arrangement arranged to attach the viewport assembly to a welding apparatus, and the neck may form a passage from the attachment end to the viewing end. The neck may have an end wall of the neck at the viewing end and a window made from a high-temperature-resistant, substantially transparent material may be mounted in the end wall.

Another embodiment may take the form of a modular heat treatment system comprising a retort chamber arranged to receive an article to be welded and a retort chamber heating system arranged to heat the retort chamber to a first predefined temperature. A retort portion of an article transport arrangement may extend into the retort chamber from a first side of the retort chamber. A retort door at the first side of the retort chamber may selectively provide access to the interior of the retort chamber through the first side. A first thermal chamber may be attached to the first side of the retort chamber and may include a first portion of the article transport arrangement arranged to be connected to the retort portion of the article transport arrangement to allow transport of an article from the first thermal chamber into the retort chamber. The first thermal chamber may also include a first thermal system arranged to place an interior of the first thermal chamber at a second predefined temperature, the first thermal system being at least one of a heating system and a cooling system. A first chamber door may be provided in a side of the first thermal chamber other than a side at which the first thermal chamber is attached to the retort chamber to selectively allow access to an interior of the first thermal chamber.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

Figure 1:
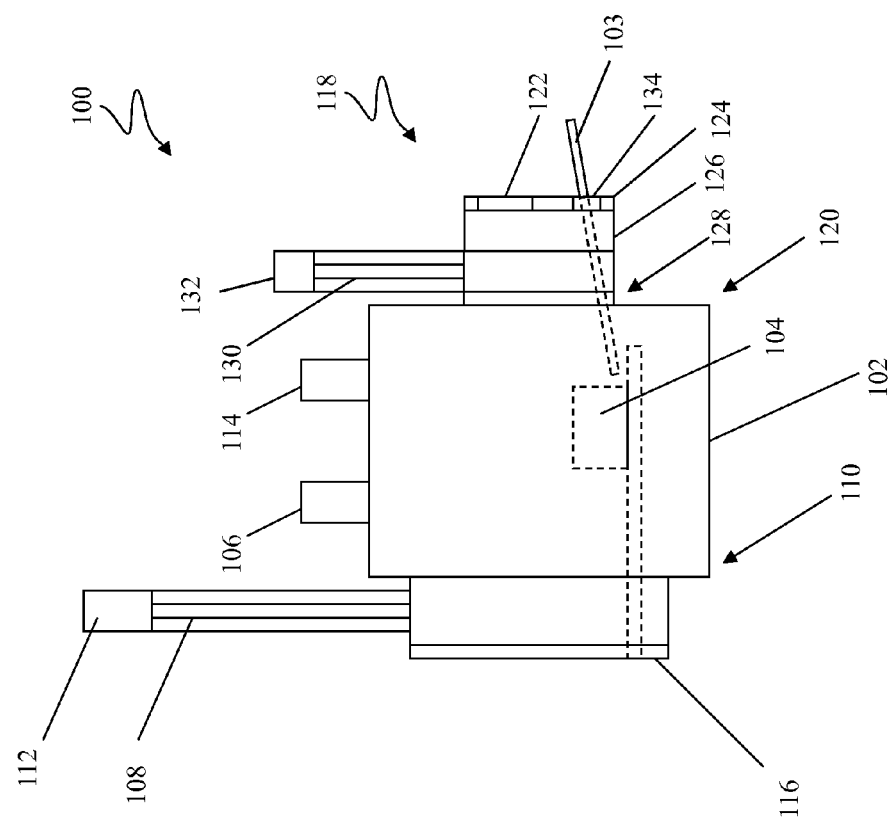
FIG. 1 shows a schematic diagram of a welding apparatus according to embodiments of the invention disclosed herein viewed from a side.
Figure 2:
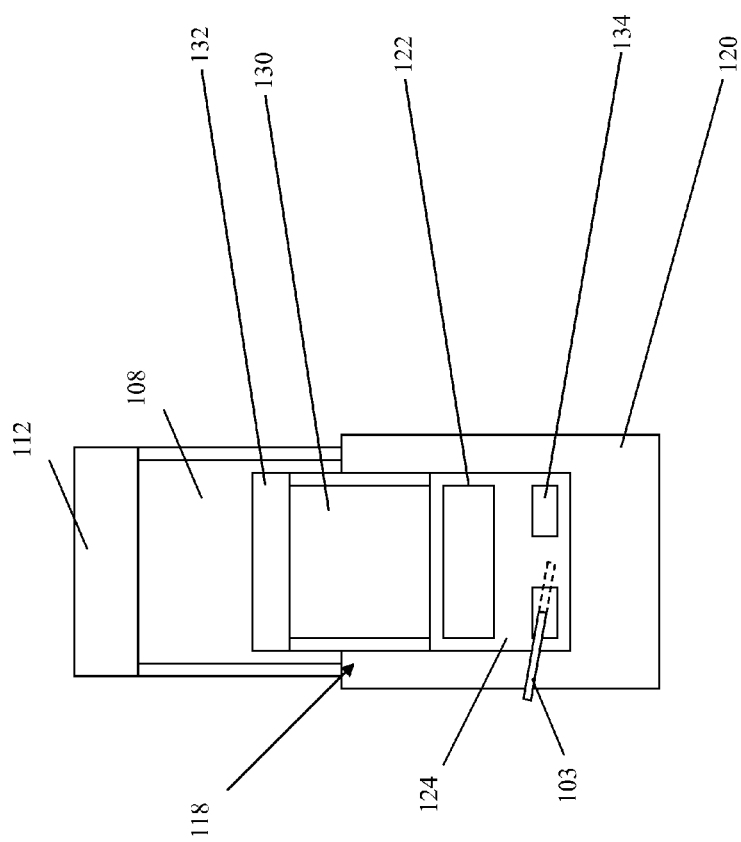
FIG. 2 shows a schematic diagram of a viewport of a welding apparatus according to embodiments of the invention disclosed herein viewed from an end.

As indicated above, aspects of the invention provide a welding apparatus and method. With reference to FIGS. 1 and 2, embodiments of the invention disclosed herein may include a welding apparatus 100 including a first enclosure 102 arranged to receive an article to be processed 104. A heating system 106 may be arranged in first enclosure 102 to heat the article to be processed 104. For example, heating system 106 may include a plurality of radiant heating elements, though other heat sources may be employed in embodiments. A first enclosure door 108 may selectively allow access to first enclosure 102 through a first side 110 of first enclosure 102. An actuator 112 may be included to open and close first enclosure door 108 as may be desired. Any suitable actuator and door may be used, though embodiments may employ a guillotine-style door of a material that may withstand extreme heat, such as a ceramic material. A suitable material should be selected to withstand temperatures required for processing the article 104, such as at least 1800 degrees Fahrenheit where an article to be processed is made from a superalloy.

In embodiments, an atmosphere control system 114 may be configured to provide a substantially inert atmosphere in first enclosure 102. For example, atmospheric control system 114 may supply argon, hydrogen, nitrogen, or another gas that will have little or no chemical interaction with the article to be processed 104. Atmospheric control system 114 may additionally induce a positive pressure in first enclosure 102 so as to prevent entry of ambient air into first enclosure 102 from the exterior of first enclosure 102. A sealing system 116 may be arranged to retain atmosphere in first enclosure 102 and/or to prevent entry of external atmosphere into first enclosure 102. Sealing system 116 may include, for example, gaskets, toothed seals, labyrinth seals, or other seals as may be appropriate.

A viewport assembly 118 on a second side 120 of first enclosure 102 may allow a user to view the interior of first enclosure 102. A window 122 made of a high-temperature-resistant, substantially transparent material may be mounted in viewport assembly 118. For example, window 122 may be made from sapphire, which may remain transparent and withstand temperatures of 1800 degrees Fahrenheit without significant damage, though other materials might be employed as suitable and/or desired. Window 122 may be mounted in an end wall 124 of a neck 126 of viewport assembly 118 attached to second side 120 of first enclosure 102 via an attachment point 128. A viewport door 130 may be provided at the attachment arrangement end of neck 126 and may selectively be closed to reduce or eliminate heat from entering neck 126 and/or to strike window 122, such as with a viewport door actuator 132. In addition, at least one access port 134 may be included in viewport assembly 118, such as in end wall 124. Access port 134 may be used, for example, to allow a user selective access to first enclosure 102, such as to use a welding device 103 to weld the article to be processed 104. Attachment point 128, access port 134, window 122, and/or other portions of viewport assembly 118 may include seals compatible with sealing system 116 of first enclosure 102 so as to preserve atmospheric integrity within first enclosure 102 and in viewport assembly 118 as controlled by atmosphere control system 114.

Figure 3:
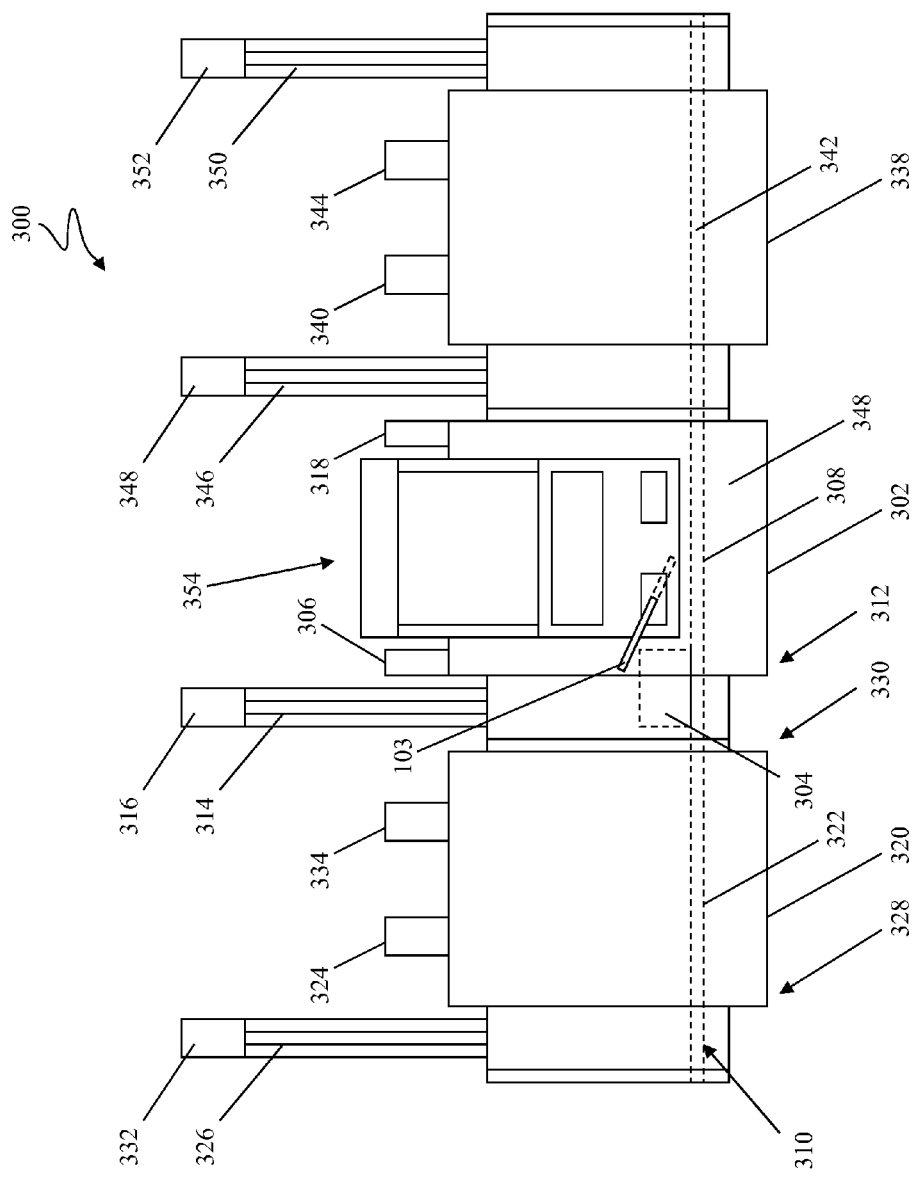
FIG. 3 shows a schematic diagram of a welding apparatus according to embodiments of the invention disclosed herein.

In another embodiment of the invention disclosed herein, as seen in FIG. 3, a modular heat treatment system 300 may include a retort chamber 302 arranged to receive an article to be welded 304. A retort chamber heating system 306 may be arranged to heat retort chamber 302 to a first predefined temperature, and a retort portion 308 of an article transport arrangement 310 may extend into retort chamber 302 from a first side 312 of retort chamber 302. A retort door 314 at first side 312 of retort chamber 302 may selectively provide access to the interior of retort chamber 302 through first side 312, such as by being opened and closed by an actuator 316. An atmospheric control system 318 may maintain an atmosphere within retort chamber 302, such as by maintaining an atmosphere of a gas that is substantially inert with respect to the article to be processed. For example, argon, hydrogen, nitrogen, or another gas that is substantially non-reactive with superalloys used in turbine blades may be used.

A first thermal chamber 320 attached to first side 312 of retort chamber 302 may include a first portion 322 of article transport arrangement 310 and may be arranged to be connected to retort portion 308 of article transport arrangement 310 to allow transport of an article from first thermal chamber 320 into retort chamber 302 and vice versa. First thermal chamber 320 may include a first thermal system 324 arranged to place an interior of first thermal chamber 320 at a second predefined temperature. In embodiments, first thermal system 324 may be a heating system, while in other embodiments, first thermal system 324 may be a cooling system, depending on the particular processes sought to be performed with modular heat treatment system 300. First thermal chamber 320 may further include a first chamber door 326 in a side 328 of first thermal chamber 320 other than a side 330 at which first thermal chamber 320 is attached to retort chamber 302. Like retort door 314, first chamber door 326 may selectively allow access to an interior of first thermal chamber 302, such as by being opened and closed with actuator 332. Both retort door 314 and first chamber door 326 may be made from heat-resistant materials selected to withstand and/or insulate against temperatures retort 302 and/or first thermal chamber 320 may experience. First thermal chamber 320 may additionally include an atmospheric control system 334 arranged to maintain a desired atmosphere within first thermal chamber 320 and/or retort chamber 302, like atmospheric control system 318 of retort chamber 320. Atmospheric control systems 318, 334 may coordinate in embodiments, or may operate independently, or one may become a portion of the other as suitable and/or desired.

In embodiments, a second thermal chamber 338 may be attached to retort chamber 302 or first thermal chamber 320. Second thermal chamber 338 may be substantially structurally identical to first thermal chamber 320 and/or retort chamber 302, and may include a second thermal system 340, a respective portion 342 of article transport arrangement 310, and/or a respective atmospheric control system 344 that may coordinate with and/or become part of retort atmospheric control system 318 and/or first thermal chamber atmospheric control system 334 to maintain a substantially inert atmosphere in retort 302, first thermal chamber 320, and/or second thermal chamber 338. Second thermal chamber 338 may also include a second chamber door 346 operated by an actuator 348 to provide access between second thermal chamber 338 and retort chamber 302. Where second thermal chamber 338 is the last thermal chamber, it may also include an end door 350 operated by a respective actuator 352.

By providing such substantially structurally identical thermal chambers, a heat treatment system may be assembled that may perform any heat treatment cycle desired. For example, in the example shown, first thermal chamber 320 may be a pre-heat chamber in which an article may be heated to a first temperature for a first period in preparation for entry into retort chamber 302, and second thermal chamber 338 may be a cooling chamber. Additional chambers could be connected to either end of the assembly to accommodate whatever additional steps might be performed, each chamber including a suitable heating or cooling system as its thermal system.

A viewport assembly 354 may be attached to a second side 348 of retort chamber 302 and arranged to allow viewing of an interior of retort chamber 302 from an exterior of retort chamber 302. Viewport assembly 354 may, for example, be provided as described with respect to FIGS. 1 and 2 above. Additional such viewport assemblies may be attached to any of first or second thermal chamber 320, 338, and/or any additional thermal chambers of modular heat treatment system 300 as may be provided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A welding apparatus comprising:
   a first enclosure arranged to receive an article to be processed;
   a heating system arranged to heat the article to be processed in the first enclosure;
   a first enclosure door into the first enclosure arranged to selectively allow access to the first enclosure through a first side of the first enclosure;
   an atmosphere control system arranged to provide a substantially inert atmosphere in at least the first enclosure, the atmosphere control system including a sealing system arranged to retain a desired atmosphere in each enclosure under control of the atmosphere control system; and
   a viewport assembly on a second side of the first enclosure, the viewport assembly including a neck attached to the second side of the first enclosure, the neck extending from the second side of the first enclosure to an end wall of the viewport assembly that includes a window made of a high-temperature-resistant, substantially transparent material and arranged to allow viewing of the first enclosure from outside the first enclosure, the viewport assembly further including at least one access port through which access to the first enclosure is selectively gained by a user and through which a welding device is selectively controlled.

2. The welding apparatus of claim 1, wherein the welding device may be selectively inserted through the access port.

3. The welding apparatus of claim 1, wherein the viewport assembly includes a viewport door adjacent the second side of the first enclosure and arranged to selectively close the viewport assembly to reduce heat transmission into the viewport assembly from the first enclosure.

4. The welding apparatus of claim 3, wherein the viewport door is a guillotine door and the viewport assembly further includes a viewport door actuator arranged to move the viewport door between an open position and a closed position.

5. The welding apparatus of claim 1, wherein the window is made from a material that substantially maintains structural integrity to at least 1800 degrees Fahrenheit.

6. The welding apparatus of claim 5, wherein the window is made from sapphire.

7. The welding apparatus of claim 1, wherein the viewport assembly includes an attachment point arranged to facilitate attachment of the viewport assembly to the second side of the first enclosure.

8. The welding apparatus of claim 1, wherein the sealing system substantially prevents external atmosphere from entering the first enclosure and the viewport assembly.

* * * * *